United States Patent Office.

EDWARD BEANES, OF CORDWALLES, (NEAR MAIDENHEAD,) GREAT BRITAIN.

Letters Patent No. 88,004, dated March 23, 1869.

IMPROVEMENT IN BREWING.

The Schedule referred to in these Letters Patent and making part of the same.

*To all whom it may concern:*

Be it known that I, EDWARD BEANES, of Cordwalles, (near Maidenhead,) in the county of Berks, Kingdom of Great Britain and Ireland, have invented certain new and useful "Improvements in Brewing;" and I do hereby declare that the following is a full and exact description thereof, that is to say—

My invention of improvements in brewing consists in the use of sulphurous acid in the state of gas or its aqueous solution, or of acid sulphites, or bisulphites of sodium, potassium, calcium, magnesium, ammonium, or aluminium.

These chemical agents are applied to the brewing-materials, such as malt or sugar, directly, or mixed with the water, added to them before their entrance into the mash-tun, during the process of mashing, or during the process of boiling the wort with the hops; but I prefer to operate during the mashing, and with the aqueous solution, or the salts of sulphurous acid.

I am aware that some attempts have been made heretofore to preserve brewed liquors that have undergone the process of fermentation, by adding to them solutions of sulphurous acid, or acid sulphites, or bisulphites, but such attempts have always been confined to applications of the chemical agents to the liquors after the fermentation has taken place, with the view of thereby remedying the tendency of the fermented liquors to become sour.

The common experience of brewers would have led them, prior to the date of my invention, to anticipate that the chemical agents used by me would have an injurious effect upon the fermentation-process, if used at the stages proposed by me, and that the brewed liquor would be thereby spoiled.

I have, however, discovered that by applying the above-mentioned chemical agents as herein described, the tendency of the brewed liquor to become sour is prevented, the quality of the brewed liquor is greatly improved, and it keeps very much longer than beer brewed on the old system.

I prefer to use acid sulphite of sodium, the aqueous solution of which will give a slight red color to blue litmus paper, and a very pale lead-color to red litmus paper; and I use from about sixteen to about twenty ounces of the said salt to each quarter of malt; or when sugar is used for brewing, from about sixteen to twenty ounces of the salt to two hundred pounds' weight of sugar.

When I employ sulphurous acid itself, instead of its aqueous solution, or its salts, I prefer to allow the crushed malt to fall through an atmosphere of sulphurous-acid gas, on its way to the mash-tun.

The brewing-operations are conducted in the usual way, and, as above mentioned, I apply the chemical agent by preference as follows:

When the water in the mash-tun is prepared to receive the malt, and while the latter is being delivered into the mash-tun, I introduce, for every quarter of malt, from sixteen to twenty ounces of the acid sulphite of soda at the same time, so that while the mixing of the malt with the water is going on, the salt of sulphurous acid becomes incorporated with it.

In cases where, as sometimes is the practice, the mixing of the malt with the water, or a portion of the water, takes place prior to their entrance into the mash-tun, I prefer to mix the salt of sulphurous acid with the dry malt, so that it may become incorporated with the malt when the malt and water are mixed together.

Sometimes I dissolve the salt of sulphurous acid in the water, either before or after heating the latter, and before mixing the malt with it, or a portion of the salt of sulphurous acid may be put into the water, and the remainder in the malt, as above mentioned.

When I introduce the salt of sulphurous acid into the copper, during the process of boiling the wort with the hops, I prefer to do so just when the wort is on the point of boiling.

The rest of the brewing-operation is concluded in the usual way.

The result of the adoption of this invention will be the production of beer which is light in color, which brightens quickly, keeps well, and is excellent in quality.

I claim, in the process of brewing, the treating the brewing-materials with sulphurous acid, or the salts of sulphurous acid, hereinbefore mentioned, before their entrance into the mash-tun, during the process of mashing, or during the process of boiling the wort with the hops, and consequently before the fermentation of the liquor has taken place, and the production thereby of an improved quality of beer.

In testimony whereof, I have signed my name to this specification, in the presence of two subscribing witnesses.

EDW'D BEANES.

Witnesses:
    BRISTOW HUNT,
        *Solicitor and Patent Agent,*
          1 *Serle Street, London.*
    HY. GEER,
        *Clerk to the said Bristow Hunt.*